UNITED STATES PATENT OFFICE.

FELIX RICHTER, OF FRANKFORT-ON-THE-MAIN, GERMANY.

ACTIVE CARBON AND PROCESS OF MAKING THE SAME.

1,066,322. Specification of Letters Patent. Patented July 1, 1913.

No Drawing. Application filed January 13, 1911. Serial No. 602,514.

*To all whom it may concern:*

Be it known that I, FELIX RICHTER, a citizen of the German Empire, residing at Frankfort-on-the-Main, Germany, have invented certain new and useful Improvements in Active Carbon and Processes of Making the Same, of which the following is a specification.

This invention relates to the purification of hydrocarbons and alcoholic liquids by means of active carbon and consists in the use of carbon of a special kind for the above purpose, and in a process for the manufacture of such carbon. For instance, by simple mechanical treatment with the said active carbon, crude lighting oil, and so-called washing petroleum can be converted into the purest petroleum, and in the same way potato or grain spirit can be purified to such an extent as to enable it to be used for drinks, liqueurs and scents.

In itself, the use of porous carbon, namely of charcoal, for the purification of spirits is well known, but hitherto it has been impossible by the sole use of carbon to bring the liquids in question into such a state of purity as required for the above purposes. The result in question is however easily obtained by replacing charcoal, bone black, etc., by a peculiar carbon containing material of a property hitherto unknown the active surface of which per unit of weight of the material, is so large that no purifying bodies hitherto used, can be compared with it. A carbon of such activity is for instance obtained from the coal dust produced in briquet works, by mixing it with finely divided mineral substances such as clay, ground chalk, slaked lime, ashes, caput mortuum and the like and distilling it dry. The action of this carbon on the liquids to be purified, is a two-fold one, namely a chemical and a physical one. Purely physical is the absorbing action, by means of which certain kinds of substances, such as fusel oils and substances containing nitrogen and sulfur, are retained on the surface of the particles of carbon. At the same time, however, oxygen of the air is condensed on the said surface, and consequently exercises a considerably stronger oxidizing action than in its ordinary state. This explains why, when crude petroleum and spirits are mixed with the active carbon prepared according to this invention, there takes place an ample generation of gases, sometimes continuing for 24 hours, sulfur compounds, more particularly $H_2S$ and $H_2SO_3$ and also perfumes containing sulfur and nitrogen, which cannot be determined, being easily perceptible among the said gases owing to their smell and other reactions. Investigations of these and other still not completely explained chemical processes which apparently play the chief part in the application of the new carbon are not yet completed, but the action has been clearly demonstrated by the nature of the purified product compared to the crude product. This peculiar action of the new active carbon which substantially differs from that of the well known active carbon made from ordinary brown coal or the like, must be attributed to the fact that the coal dust precipitated in briquet works, has its origin in the finely divided resins originally contained in the carbonized plants, and in the very tender or fine cellular fabrics of leaves, needles of the vegetable pith or medulla and similar parts of the plants. When carbonized and subsequently dried and ground in the briquet works they easily separate owing to vibrations, from carbon particles produced from the tougher cellular substance of the wood, float owing to their exceeding fineness and light weight and fill the air of the briquet factory, and when mixed with the same, can be recovered only by exhausters and closest filter cloth and by means of water jet blowers.

For purifying liquids, the process is such that the liquids are mixed with the finely divided active carbon and stirred, and when it is a question of purifying hydro-carbons, finely divided air is preferably supplied at the same time.

Petroleum purified in the manner described, has a pleasant benzin-like, ethereal smell, and burns with a bright flame which does not smell or smoke. Even after the flame is extinguished, there is no unpleasant generation of gases perceptible, and the lamp chimneys remain clean for a long time. Alcohol purified in the same manner, does not contain any fusel oil, is practically without smell and has an excellent flavor.

The action of the new carbon is particularly striking in the case of potato spirit in which, after the purification, there is to be found a new ether having the smell of heliotrope. This ether has not been discovered by the former, less thorough purifying methods, and when my process is used imparts to the potato spirit a fragrance similar to that of grain spirit, and also the flavor of the latter. In certain kinds of petroleum and alcohol, the action of the new active carbon is accelerated by making the liquid to be purified, alkaline by lime or the like.

What I claim is:

1. A composition of matter consisting of a finely-divided dry distilled mixture of mineral matter and the carbon dust produced in the manufacture of briquets from brown coal.

2. The process of manufacturing a highly active carbon mixture which consists in mixing mineral matter and the carbon dust produced in the manufacture of briquets from brown coal and subjecting the mixture to dry distillation.

3. A composition of matter consisting of a finely-divided dry distilled mixture of mineral matter with the lighter and more active constituents of brown coal.

4. The process of manufacturing a highly active carbonaceous mixture from brown coal, which consists in separating from the coal the lighter and more active constituents thereof, and submitting the same, mixed with mineral material, to dry distillation.

In testimony whereof, I affix my signature in presence of two witnesses.

FELIX RICHTER.

Witnesses:
 JEAN GRUND,
 CARL GRUND.